United States Patent [19]
Steger

[11] Patent Number: 5,470,592
[45] Date of Patent: Nov. 28, 1995

[54] APPARATUS FOR GENERATING CLAMPING FORCE IN INJECTION MOLDING MACHINES

[75] Inventor: Reinhard Steger, Freiburg, Germany

[73] Assignee: Ferromatik Milacron Maschinenbau GmbH, Malterdingen, Germany

[21] Appl. No.: 319,705

[22] Filed: Oct. 7, 1994

[30] Foreign Application Priority Data

Oct. 27, 1993 [DE] Germany .................. 43 36 572.8

[51] Int. Cl.$^6$ .................................. B29C 45/64
[52] U.S. Cl. .................... 425/3; 425/451.9; 425/595; 425/DIG. 33
[58] Field of Search ............... 425/3, 590, 589, 425/593, 595, 450.1, 451.2, 451.6, 451.7, 451.9, DIG. 33

[56] References Cited

U.S. PATENT DOCUMENTS 3,887,312  6/1975  Seary ........................... 425/3
4,008,021  2/1977  Fedrigo et al. ................. 425/3
5,322,430  6/1994  Kasai et al. .................... 425/3
5,352,394  10/1994  Fujita et al. ................... 425/3

FOREIGN PATENT DOCUMENTS 256477  5/1988  Germany .

Primary Examiner—James P. Mackey
Attorney, Agent, or Firm—Stephen H. Friskney

[57] ABSTRACT

In an apparatus for generating clamping force in injection molding machines having stationary and moving platens, between which an injection molding die is mounted, and a traversing mechanism associated with the moving platen for opening and closing of the injection molding die, the present invention provides means for locking the traversing mechanism after the molding die has been closed. The clamping force required during injection is generated by at least one element made of a magnetostrictive material that is mounted between the traversing mechanism and the moving platen. Each magnetostrictive element is surrounded by a magnetic coil that is controllably energized to produce an alternating magnetic field which causes elongation of the associated element, generating the clamping force.

8 Claims, 3 Drawing Sheets

APPARATUS FOR GENERATING CLAMPING FORCE IN INJECTION MOLDING MACHINES

BACKGROUND OF THE INVENTION

1. Field of Invention

The invention concerns apparatus for generating clamping force in injection molding machines, and more particularly apparatus wherein the clamping force is generated by magnetostrictive elements in the clamping mechanism.

2. Description of the Related Art

During the injection molding of thermoplastic parts, the plastic melt is injected under high pressure into the mold cavity of the injection molding die. The clamping force applied to the die must be adequate to maintain proper closure. Specifically, this clamping force or mold locking force must be greater than the expansion force that develops in the mold cavity during the injection process.

The clamping mechanisms used for injection molding are typically operated fully hydraulically, hydraulically-mechanically or electro-mechanically. For all machine types, it is necessary to configure the machine so that the clamp mechanism will produce sufficient force for securely clamping the mold elements against the injection pressure after the mold is closed.

The moving platen in hydraulic clamp mechanisms is typically moved toward the stationary platen by means of high-speed hydraulic cylinders until the mold is closed. During injection these cylinders must also create the necessary clamping pressure which naturally requires a large volume of hydraulic oil. Given the potential for leakage, the presence of oil is a real disadvantage from the standpoint of environmental protection. Moreover, there is a hazard that the hydraulic components will fail right at the point of injection, thereby posing a threat to operating personnel, not to mention the fact that unusable parts are produced.

Alternatively, the clamp mechanism can include a toggle linkage. During buildup of the clamping force the toggle-linkage bearings are subject to a high dynamic load, which enables rapid closure. In clamp mechanisms driven by an electric motor, for example, mechanisms including ball screws or trapezoidal screw threads, an enormous motor load occurs in the injection phase in order to maintain the required clamping force.

Although these various clamp mechanisms all provide two distinct functions, i.e. (1) rapid closing and opening movement at limited force, and (2) generating a large force with limited movement, both are produced by the same machine elements. Accordingly, the clamping mechanisms must be designed reliably at a reasonable cost.

SUMMARY OF THE INVENTION

An object of the invention is to provide a clamping mechanism for an injection molding machine in which the rapid closure movement and the subsequent clamping force generation are decoupled. This object is accomplished by the use of magnetostrictive materials to create the actual mold clamping force required for the injection molding process.

Magnetostrictive materials are special alloys that experience a defined change in length or create a defined force in a magnetic field of specific frequency and intensity. The length change depends on the alloy employed, on the length of the magnetostrictive component used, and on the intensity of the magnetic field developed. The force produced is proportional to the cross-sectional area of the magnetostrictive component. The magnitude of the length change normally lies in the range from 0 to 1 mm. In a magnetic field of $10^5$ A/m the attainable force lies in the range of 20N/mm$^2$, i.e., a force of about 200 kN can be achieved at a sample diameter of about 120 mm.

It is possible by means of the present invention to design more easily and cost effectively the high-speed mechanism that is now only required to apply the relatively limited force to traverse the moving platen. By reliable and stable locking of the traversing mechanism in the closed position, a structure is created that takes up the reaction forces occurring when the magnetostrictive components generate the desired clamping force due to their elongation from application of the required magnetic field.

When hydraulic traversing cylinders are used, only minimal oil is required, and the mechanical stresses on the components of the cylinder are relieved. Similarly, the stress on the toggle lever bearings are relieved during use of toggle linkages, since these are merely under a static load. In electro-mechanically driven closure mechanisms with traversing ball screws or comparable movement units, the motors are no longer additionally loaded during clamp force generation, thereby increasing their operational life. It is important in all variations of the invention that the rapid closing/opening movement at relatively limited force expenditure, and the clamp force generation at short movement length and high force expenditure be strictly separated from each other.

A further advantage of the present invention is that existing machines can also be refitted relatively quickly and simply. Moreover, the embodiment according to the invention guarantees rapid and problem-free control of the closing force to be applied by simply changing the magnetic field intensity. At the end of the injection process the magnetic field is disconnected, the locking member of the traversing mechanism is disengaged and the mold can be opened.

The alloy $Tb_{0.27}Dy_{0.73}Fe_2$, a material with particularly good magnetostrictive properties, is proposed as magnetostrictive material for the force elements. This alloy is effective in creating the high mechanical forces required for injection molding. In addition, this alloy has proven to be superior to all other available materials with respect to creation of mechanical energy at low-frequency (in the range of 0 to 5 kHz).

If desired, similar magnetostrictive elements can also be provided on the injection side of the machine and, for example, used to apply the nozzle touch force.

An additional advantageous embodiment of the invention includes a clamp mechanism in which the moving platen is traversed by means of axially displaceable tie bars. This construction provides an even more compact design for the clamping mechanism, since the tie bars themselves are part of the traversing mechanism. For example, the tie bars can be the piston rods of the hydraulic cylinders forming the traversing mechanism. In this case, the magnetostrictive elements are preferably arranged between the moving platen and the plate joining the ends of the tie bars. The plate thus serves as a stop for the magnetostrictive elements so that they can generate the mold clamping force during application of the magnetic field. Alternatively, however, the magnetostrictive elements can also be arranged between the components of the traversing mechanism and the stationary platen.

DESCRIPTION OF THE PREFERRED EMBODIMENTS

Figure 1:
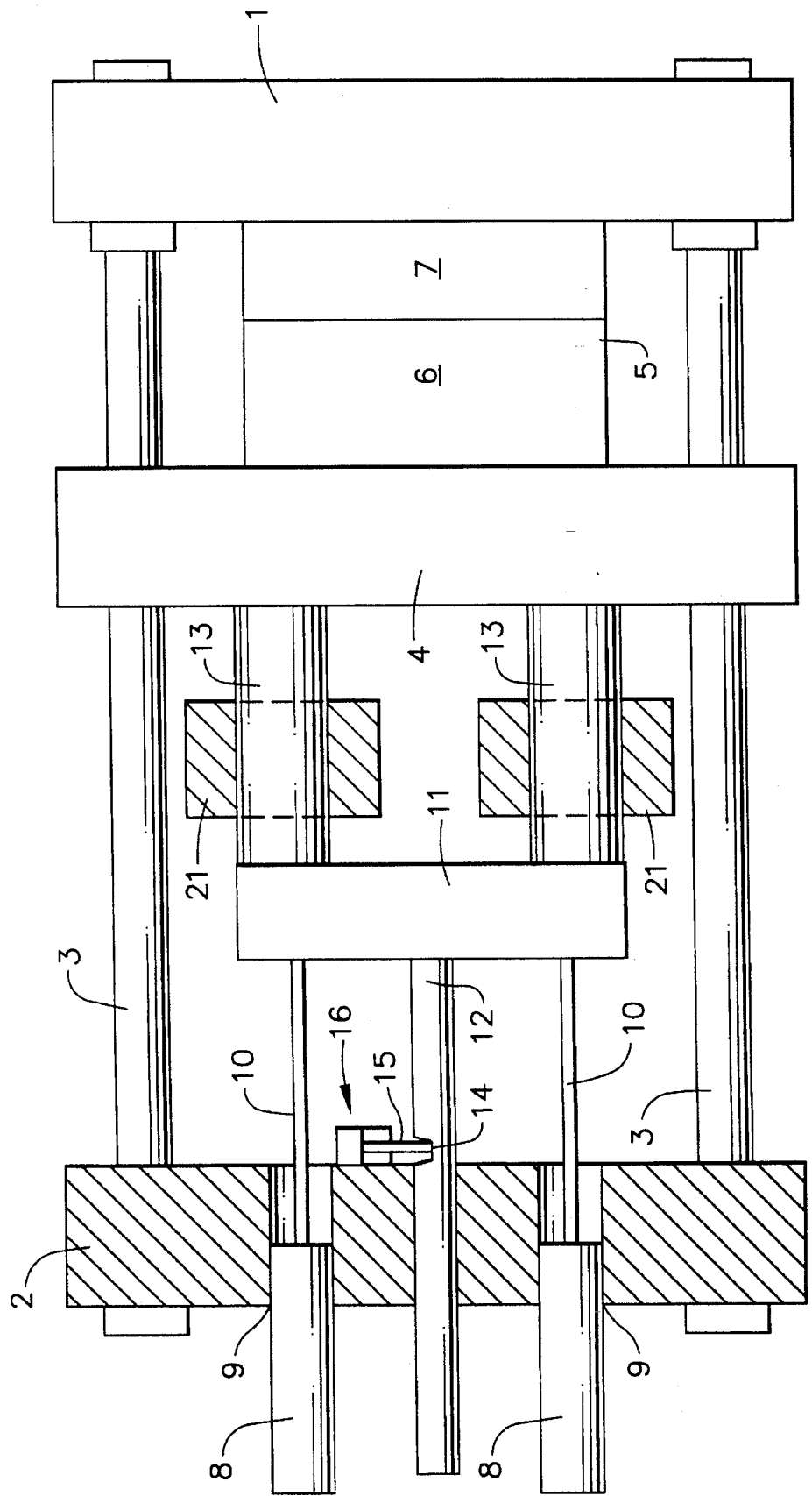
FIG. 1 schematically depicts the clamping mechanism of an injection molding machine which includes a high-speed hydraulic device for traversing the moving platen.

For ease in understanding the present invention, parts which have the identical function are denoted with the same reference numbers in the figures of the drawing.

Figure 2:
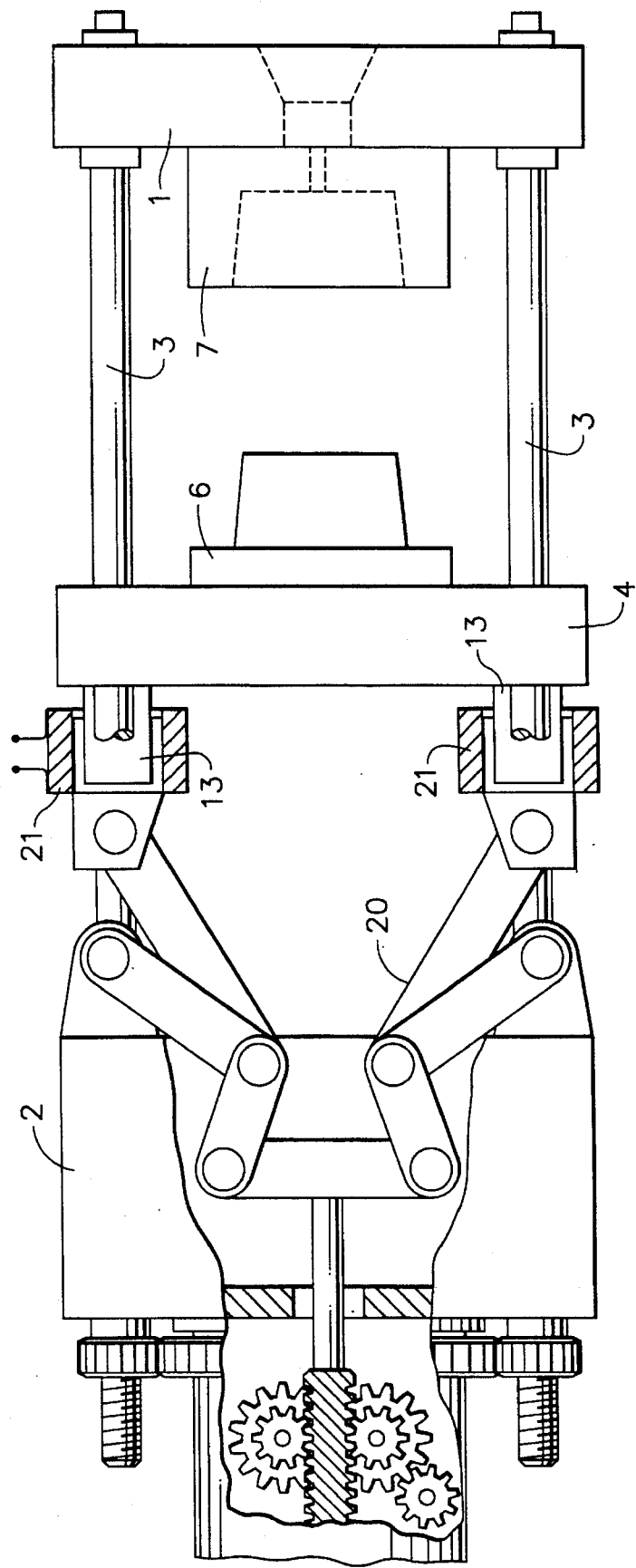
FIG. 2 schematically depicts the clamping mechanism of an injection molding machine which includes a toggle linkage for traversing the moving platen.

The clamping mechanism of an injection molding machine as shown in FIGS. 1 and 2 has a front stationary platen 1 and a rear stationary platen 2, which are connected generally by four tie bars 3, only two of which are shown. A moving platen 4 is guided on tie bars 3 between the stationary platens 1 and 2. An injection molding die 5 is attached between the front stationary platen 1 and the moving platen 4. More specifically, the die 5 consists of two halves 6 and 7 that define the mold cavity and are mounted on the moving platen 4 and stationary platen 1 respectively. The injection molding die 5 is shown in FIG. 1 in its closed position and in FIG. 2 in the open position.

Referring particularly to FIG. 1, hydraulic cylinders 8, which are fixed in recesses 9 in rear stationary platen 2 and whose piston rods 10 engage an intermediate plate 11, are used to traverse the moving platen 4. A rod 12 is installed to pass through stationary platen 2 and connect to intermediate plate 11, providing improved stability of intermediate plate 11 as it traverses with moving platen 4. A recess 14, sized to receive the locking bars 15 of a locking unit 16 mounted on the stationary platen 2, is provided in the guide rod 12.

The intermediate plate 11 is joined to the moving platen 4 on the side opposite the connection to hydraulic cylinders 8 by means of several cylindrical elements 13, only two of which are shown. The elements 13 consist of a magnetostrictive alloy, for example, $Tb_{0.27}Dy_{0.73}Fe_2$. This particular material reacts almost without a lag to changes in the magnetic field. For example, a 10 cm long rod lengthens by more than 0.1 mm in only 50 microseconds. Construction of the elements 13 from such material permits direct coupling of the electrical and mechanical systems. Furthermore, this alloy can withstand high pressure stresses on the order of several hundred megapascals. It is thus in a position to create the high mechanical forces required for injection molding.

Each magnetostrictive element 13 is enclosed by a magnetic coil 21 that is controlled to generate an alternating magnetic field. The current-carrying coils 21 used for magnetization exhibit limited impedance and are operated at relatively low voltage.

An alternative application of the present invention similar in principle to the hydraulic clamp mechanism of FIG. 1 is shown in FIG. 2. However, in this case the die is shown open and the high-speed device responsible for closing and opening the molding die 5 is a toggle linkage 20. In this alternative embodiment, the connecting ends of the toggle linkage 20 are not in direct contact with the moving platen 4, but attach to elements 13 made of magnetostrictive material connected to the moving platen 4, the elements 13 being enclosed by magnetic coils 21.

The injection process occurs as follows according to the present invention:

The moving platen 4 and mold half 6 are closed against the stationary platen 1 and mold half 7 by means of a high-speed traversing mechanism. The traversing mechanism is locked in this closed position. This occurs, for example, in a traversing mechanism consisting of hydraulic cylinders 8 (FIG. 1) in such a way that the locking bars 15 of the locking device 16 are pushed into the recess 14 provided in guide rod. After locking, the magnetic fields needed to cause the length change of magnetostrictive elements 13 are produced via the magnetic coils 21 enclosing the magnetostrictive elements 13. The elements 13 elongate, generating the forces required for restraining the moving platen 4 and containing the injection pressure in the molding die 5. After the injection process is concluded and the injected material has sufficiently solidified, the magnetic coils 21 are disconnected to remove the magnetic fields, locking of the high-speed mechanism is disengaged, and the die halves 6 and 7 are separated so that the injection molded part can be removed.

Figure 3:
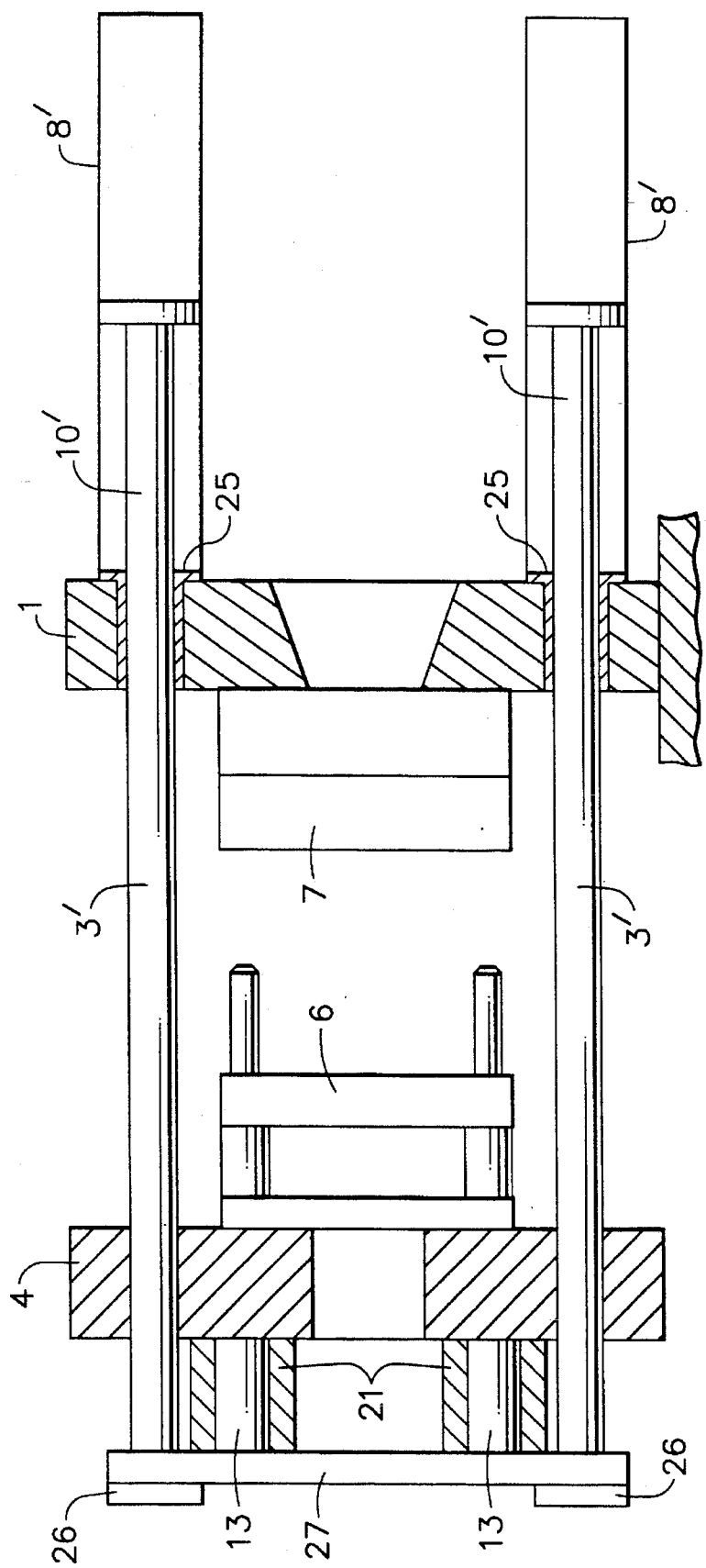
FIG. 3 shows an alternative embodiment for the clamping mechanism of an injection molding machine with displaceable tie bars.

FIG. 3 shows an alternative embodiment of the invention in which the tie bars 3' that span the stationary platen 1 and the moving platen 4 are displaceable axially. In this practical example, the tie bars 3' serve as piston rods 10' of the hydraulic cylinders 8' forming the traversing mechanism, and are attached to the stationary platen 1 on the injection side. Tie bars 3' are constrained to move axially in the guides 25 that pass through stationary platen 1. The tie bars 3' also pass through the moving platen 4 after which the free ends 26 of the tie bars 3' are joined by a plate 27 referred to as a yoke plate. The magnetostrictive elements 13 with the surrounding magnetic coils 21 are arranged between the plate 27 and the moving platen 4.

By retracting the tie bars 3' into the hydraulic cylinders 8', the plate 27 together with the magnetostrictive elements 13 and the moving platen 4 are closed onto the stationary platen 1, so that the respective halves 6 and 7 of molding die 5 are closed. After locking by a suitable mechanism (not shown) of tie bars 3' with the die 5 in the closed position, the magnetic fields are applied by the coils 21 and the magnetostrictive elements 13 lengthen. Since the elements 13 are supported by plate 27, the elongation generates a force which acts on the moving platen 4, so that the required clamping force is generated.

While the invention has been illustrated in some detail according to the preferred embodiments shown in the accompanying drawings, and while the preferred embodiments have been described in some detail, there is no intention to thus limit the invention to such detail. On contrary, it is intended to cover all modifications, alterations, and equivalents falling within the spirit and scope of the appended claims.

What is claimed is:

1. Apparatus for generating clamping force in an injection molding machine having a stationary platen, a moving platen, an injection molding die mounted between the stationary platen and moving platen, and a traversing mechanism connected to the moving platen for opening and closing of the injection molding die, characterized in that the traversing mechanism is lockable by a locking device when the injection molding die is closed, and at least one element consisting of a positively magnetostrictive material is provided between the traversing mechanism and one of the platens, each element being enclosed by a magnetic coil that generates an alternating magnetic field.

2. An apparatus as defined in claim 1, wherein the traversing mechanism includes high-speed hydraulic cylinders that are connected to the moving platen via the magnetostrictive elements.

3. An apparatus as defined in claim 1, wherein the traversing mechanism includes a toggle linkage.

4. An apparatus as defined in claim 1, wherein the traversing mechanism includes ball screws driven by at least one electric motor.

5. An apparatus as defined in claim 1 wherein the field intensity of the magnetic coils is adjustable.

6. An apparatus as defined in claim 1 wherein the magnetostrictive elements consist of the alloy $Tb_{0.27}Dy_{0.73}Fe_2$.

7. An apparatus as defined in claim 1 wherein the moving platen is mounted on tie bars which pass through guides in the stationary platen, the tie bars being movable in an axial direction relative to the stationary platen by means of the traversing mechanism.

8. An apparatus as defined in claim 7, wherein the magnetostrictive elements are mounted between the moving platen and a plate that joins adjacent ends of the tie bars, the plate serving as an abutment for the magnetostrictive elements.

* * * * *